(12) United States Patent
Bethke et al.

(10) Patent No.: US 8,447,719 B2
(45) Date of Patent: *May 21, 2013

(54) COMPILATION OF CAUSAL RULES INTO CONTINUATIONS

(75) Inventors: Bob Bethke, Fort Collins, CO (US); Srikanth Natarajan, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1117 days.

This patent is subject to a terminal disclaimer.

(21) Appl. No.: 12/239,755

(22) Filed: Sep. 27, 2008

(65) Prior Publication Data

US 2009/0182698 A1 Jul. 16, 2009

Related U.S. Application Data

(60) Provisional application No. 61/011,103, filed on Jan. 14, 2008.

(51) Int. Cl.
*G06N 5/02* (2006.01)
*G06F 9/44* (2006.01)

(52) U.S. Cl.
USPC .............................. 706/49; 706/60; 717/127

(58) Field of Classification Search
USPC ..................................... 706/49, 60; 717/127
See application file for complete search history.

(56) References Cited

U.S. PATENT DOCUMENTS

| | | | |
|---|---|---|---|
| 4,937,825 A | 6/1990 | Ballard et al. |
| 5,590,332 A | 12/1996 | Baker |
| 5,881,291 A | 3/1999 | Piazza |
| 6,636,981 B1 | 10/2003 | Barnett et al. |
| 6,691,249 B1 | 2/2004 | Barford et al. |
| 6,907,549 B2 | 6/2005 | Davis et al. |
| 6,966,015 B2 | 11/2005 | Steinberg et al. |
| 7,020,802 B2 | 3/2006 | Gross et al. |
| 7,103,874 B2 | 9/2006 | McCollum et al. |
| 7,113,988 B2 | 9/2006 | Chirashnya et al. |
| 7,197,546 B1 | 3/2007 | Bagga et al. |
| 7,197,561 B1 | 3/2007 | Lovy et al. |
| 7,254,745 B2 | 8/2007 | Briskey et al. |
| 7,631,222 B2 | 12/2009 | Hasan et al. |
| 2003/0097588 A1 | 5/2003 | Fischman et al. |
| 2003/0235280 A1 | 12/2003 | Shafie-Khorasani et al. |
| 2004/0078683 A1 | 4/2004 | Buia et al. |
| 2004/0181709 A1 | 9/2004 | Gibson et al. |
| 2005/0091640 A1 | 4/2005 | McCollum et al. |
| 2005/0172306 A1 | 8/2005 | Agarwal et al. |

(Continued)

OTHER PUBLICATIONS

Surana, Pankaj, "Meta-Compilations of Language Abstractions", Jun. 2006, NorthWestern University.

(Continued)

*Primary Examiner* — Christopher B Shin

(57) ABSTRACT

A method of compiling causal rules into continuations for use in root cause analysis of a system comprising a plurality of inter-related elements, comprising defining observable events occurring on system elements; defining at least one of a cause and a result of each of the events; defining causal rules, each rule describing a causal relationship between an event and one of its cause and its result; and compiling the causal relationships as continuations in a continuation passing style (CPS) for use in analyzing the root cause of subsequent observed events symptomatic of at least one problem on the system.

8 Claims, 3 Drawing Sheets

U.S. PATENT DOCUMENTS

| | | |
|---|---|---|
| 2005/0278273 A1 | 12/2005 | Uthe |
| 2006/0179348 A1 | 8/2006 | Florissi et al. |
| 2007/0006044 A1 | 1/2007 | Dan et al. |
| 2007/0088528 A1 | 4/2007 | Miller |
| 2007/0220368 A1 | 9/2007 | Jaw et al. |
| 2008/0016412 A1 | 1/2008 | White et al. |
| 2009/0182698 A1* | 7/2009 | Bethke et al. ................ 706/47 |
| 2009/0183023 A1 | 7/2009 | Rathunde et al. |
| 2009/0183029 A1 | 7/2009 | Bethke et al. |
| 2009/0183030 A1 | 7/2009 | Bethke et al. |
| 2009/0183031 A1 | 7/2009 | Bethke |

OTHER PUBLICATIONS

Hatcliff et.al, "A Generic Account of Continuation-Passing Style", ACM, 1994.

Dunlavey, Michael "A Progress Report on D, a compiled language Featuring Continuations", ACM SIGPLAN, 1985.

Queinnec, Christian "Continuation Conscious Compilation", Lisp Pointers, 6 (1):2-14, Jan. 1993.

Flanagan, Cormac "The Essence if Compiling with Continuations".

Appel, Andrew, "Compiling with Continuations".

Montenyohyl, Margeret "Correct Flow Analysis in Continuations Semantics", ACM 1988.

Sturm, et al., "Computer Human Error: A Root Cause Analysis Interface for Error Reporting," ACM Special Interest Group on Computer Science Education Bulletin (ACM SIGCSE), vol. 39, Issue 2, Jun. 2007, pp. 166-170.

Leszak, et al., "A Case Study in Root Cause Defect Analysis," Proceedings of the 22nd International Conference on Software Engineering (ICSE 2000), Jun. 2000, Limerick, Ireland, pp. 428-437.

Non-Final Office Action, Issued in connection with U.S. Appl. No. 12/239,747, dated Oct. 5, 2011, Filed Sep. 27, 2008, 32 pages.

Dybvig, R. Kent., "The Scheme Programming Language," Sep. 26, 2003, MIT Press, 249 pages.

Findler, et al., "DrScheme: A pedagogic programming environment for scheme," Programming Languages: Implementations, Logics, and Programs, Lecture Notes in Computer Science vol. 1292, Sep. 1997, pp. 369-388.

Hanson, Chris., "MIT Scheme Reference Manual," Massachusetts Institute of Technology, Edition 1.96 for Scheme Release 7.7.0, Mar. 13, 2002, 354 pages.

Drastal, et al., "Knowledge-based acquisition of rules for medical diagnosis," Journal of Medical Systems, vol. 6, No. 5, Oct. 1, 1982, pp. 433-445.

Stein, Anna., "SASHA: the automatic generation of rule-based diagnostic expert systems," Proceedings of the 1st International Conference on Industrial and Engineering Applications of Artificial Intelligence and Expert Systems, Jun. 1-3, 1988, Tullahoma, TN, USA, vol. 1, pp. 94-99.

Non-Final Office Action, Issued in connection with U.S. Appl. No. 12/239,751, dated Sep. 23, 2011, Filed Sep. 27, 2008, 19 pages.

Non-Final Office Action, Issued in connection with U.S. Appl. No. 12/250,887, dated Oct. 7, 2010, Filed Oct. 14, 2008, 10 pages.

Final Office Action, Issued in connection with U.S. Appl. No. 12/250,887, dated Feb. 25, 2011, Filed Oct. 14, 2008, 10 pages.

Surana, Pinku., "Meta-Compilations of Language Abstractions," Northwestern University, Jun. 2006, 212 pages.

Hatcliff, et al., "A Generic Account of Continuations-Passing Style," Proceedings of the 21st ACM SIGPLAN-SIGACT Symposium on Principles of Programming Languages, Portland, Oregon, USA, Jan. 17-21, 1994, 14 pages.

Dunlavey, Michael., "A Progress Report on D, a Compiled Language Featuring Continuations," ACM SIGPLAN, vol. 20, Issue 5, May 1985, pp. 8-15.

Queinnec, Christian, "Continuation Conscious Compilation," Lisp. Pointers, 6(1): 2-14, Jan. 1993, 13 pages.

Flanagan, et al., "The Essence of Compiling with Continuations," ACM/SIGPLAN Conference on Programming Language Design and Implementation, 2003, Published Apr. 2004, 2 pages.

Appel, Andrew., "Compiling with Continuations," Cambridge University Press, Published Nov. 29, 1991, 10 pages.

Montenyohyl, Margaret., "Correct Flow Analysis in Continuation Semantics," Proceedings of the 15th Annual ACM SIGACT-SIGPLAN Symposium on Principles of Programming Languages, San Diego, CA, Jan. 1988, pp. 204-218.

* cited by examiner

COMPILATION OF CAUSAL RULES INTO CONTINUATIONS

CROSS REFERENCE TO RELATED APPLICATIONS

This Application claims the benefit of U.S. provisional patent application Ser. No. 61/011,103, filed Jan. 14, 2008, titled "Compilation Of Causal Rules Into Continuations", which application is hereby incorporated by reference herein as if reproduced in full below.

This application is related to the following United States patent applications which are filed on even date herewith and which are incorporated herein by reference: Ser. No. 12/239,747 200701781-1/411478) entitled ROOT CAUSE ANALYSIS IN A SYSTEM HAVING A PLURALITY OF INTER-RELATED ELEMENTS; and Ser. No. 12/239,751 entitled ENGINE FOR PERFORMING ROOT CAUSE AND EFFECT ANALYSIS.

BACKGROUND

Troubleshooting a problem in a complex system comprising interconnected elements can be difficult. In computing, for example, a computer application that receives data from a data network may be operating slowly. There may be many different possible causes of such slowness, and discovering the root cause of the slowness can be difficult. Many other types of interconnected systems exist in many different fields or domains, in which it can be similarly difficult to troubleshoot a problem.

Typically an analyst, such as a system engineer, may be called upon to troubleshoot a complex system exhibiting a problem. However, the troubleshooting process becomes increasingly intractable and time consuming as the systems analyzed become more complex, especially if the sources of reported information are imperfect or limited, or the various elements of an inter-related system exist in different system levels, or have different scope, or the like.

Automated tools exist to aid the analyst in troubleshooting a complex system exhibiting symptoms that indicate a problem exists. Those tools generally use methods that filter according to similar symptoms, or correlate symptoms with known causes, or learn patterns of symptoms and correlate them with predetermined causes, or use a code book containing a set of rules for determining a root problem of symptoms. However, if a symptom experienced by a particular element has as its root cause a problem that exists on another, perhaps far removed and distantly related, element, these approaches may not be sufficient. Furthermore, the same root cause may result in many different symptoms in many different inter-related elements of the system, some of which symptoms may not have been anticipated or experienced before. It may be difficult or impossible to determine precisely, using existing practices, the root cause of one or more symptoms.

In addition, for organizational or analytical convenience, different system elements may be regarded as belonging to different "planes," each plane representing some characteristic that the elements of that plane have in common. For example, for a computer application experiencing slowness, system elements might be divided into a network plane comprising network elements such as routers, switches, and communication links; a computing plane comprising computing elements such as servers and clusters of servers; and an application plane comprising databases, served applications such as web applications, and the like. Analyzing a system is even more difficult if inter-related elements experiencing symptoms exist in different planes of the system. What is needed is a different, more capable approach to troubleshooting problems in these types of complex systems.

Continuation passing style (CPS) programming is a style of computer programming in which an object, operation, or routine is provided with an explicit "continuation" that is invoked by the object as the next operation within a program, and to which the invoking operation passes its own results. When a routine calls a subroutine, the routine may explicitly pass to the subroutine a continuation function directing the subroutine to a next step when the subroutine finishes. The continuation may be merely a direction to return the result to the calling routine. However if, for example, the subroutine call was the last step in the calling routine before processing jumps to another routine or returns to a higher level routine, then the calling routine may pass its jump or return to the called subroutine. Processing can then continue directly from the called subroutine to the higher level routine or the jump destination, bypassing returning to the calling subroutine. In other instances, the continuation may be a fixed argument of the invoking operation, or may itself be computed or chosen by the invoking operation.

The consistent use of continuations when control of a process transfers from one routine to another, by making explicit the flow of control within the overall program, can assist the programmer both in defining and in tracking the flow of control. Continuations can be used in troubleshooting to trace symptoms to their root cause, or determine what additional information may be needed to determine a root cause among a plurality of possibilities.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Overview

Figure 1:
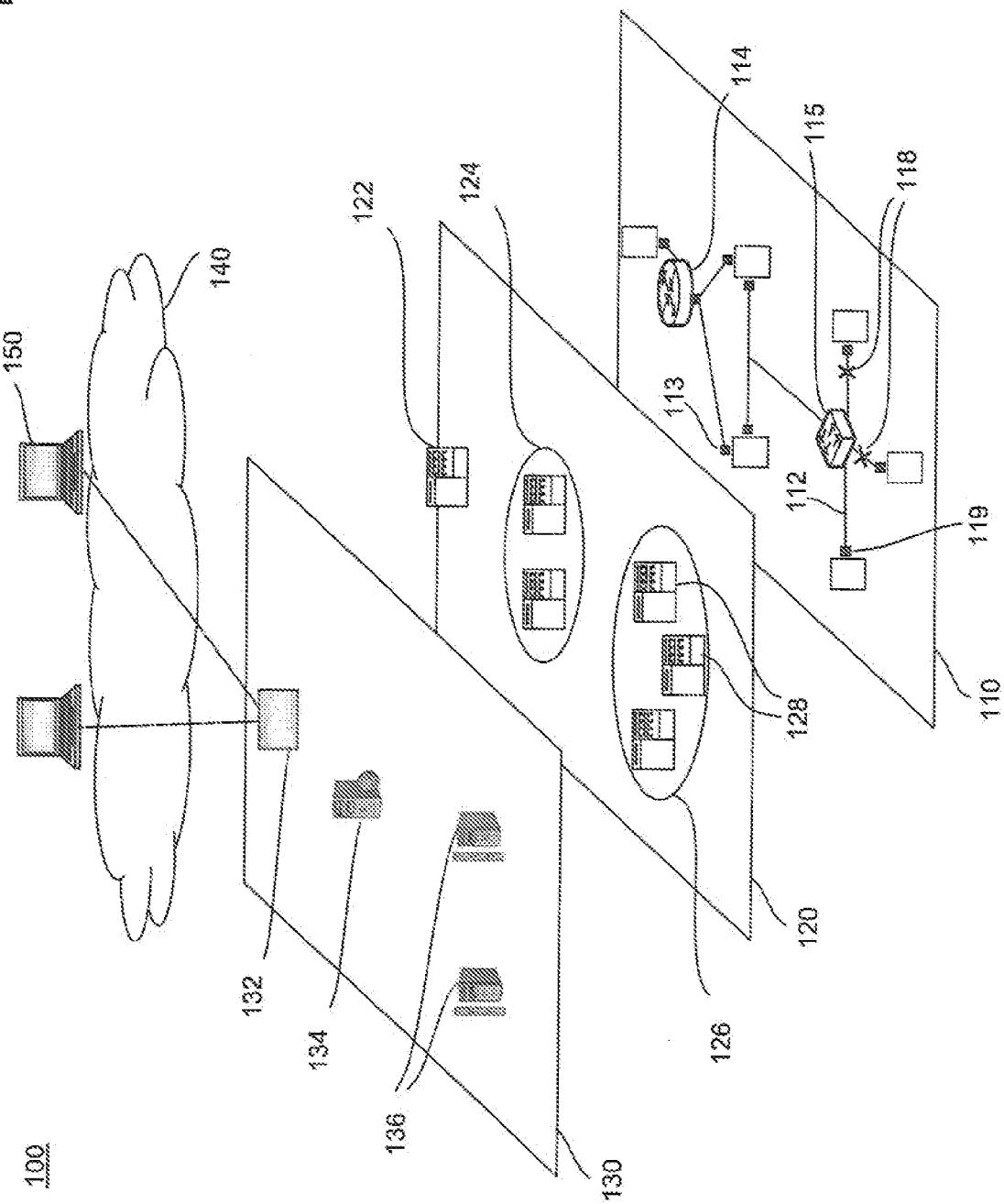
FIG. 1 shows a diagram of an exemplary networked computer system wherein various system elements exist in different planes.

As used herein, the term "condition" represents that the state of some system element, such as a managed entity, has changed from an initial, non-problematic state to a new state symptomatic of a problem. Information of state changes in system elements can be abstracted and normalized as conditions on the system elements. For example, in a computer system, management information, such as polling results, traps, and syslog messages, can be normalized as element conditions. In this way, a stream of information of elements in the network environment, such as management information from monitored elements, can be normalized into a stream of conditions indicating state changes in the monitored elements.

The term "causal rule" is used to indicate a rule relating a condition on a system element to another condition, on the same or another system element. For example, a rule might indicate that an interface of a system element becoming inoperable ("going down") can cause a related effect, such a Simple Network Management Protocol (SNMP) link going down, or an Internet Protocol (IP) address not responding to an Internet Control Message Protocol (ICMP) ping. Conditions can be related causally using causal rules.

The term "continuation" is used to represent one or more additional instructions to execute, upon the completion of a determined operation in the execution of a program.

Embodiments of the systems, methods and mechanisms described may be used in analyzing the root cause of symptoms indicative of problems in a complex system having inter-related elements. Conditions can be defined that represent symptoms indicative of a problem on the system. The conditions can be related by causal rules. The causal rules can be compiled into continuations. The causal rules and continuations, in conjunction with input conditions, such as a stream of conditions normalized from management data, can be analyzed using an analytical engine. The engine can determine and output a root cause consistent with the conditions, causal rules, and continuations. The engine can also determine and output one or more predicted effects the determined root cause may have on the system. The engine can be adapted to analyze a system of arbitrary complexity in any domain, using provided conditions, causal rules, and continuations appropriate to that system and domain.

Compilation of Causal Rules into Continuations

In an embodiment of a compilation and execution model for a declarative causal language, declarative causal rules can be compiled into continuations in a continuation passing style (CPS) of computer programming. In an exemplary implementation, a causal language in accordance with the model is presented that may be suited for determining the root cause of problems in the context of a networked computer system comprising a management application that provides information of system elements.

Causal Language Model

An illustrative embodiment of a causal language model is a straightforward declarative language model that can relate defined conditions causally. Using a programming language in accordance with the model, the transitive closure of causality among a set of conditions can determine the root cause of a given set of conditions in a system, and can also be used to analyze the effect of the root cause on the system. Conditions form operands of the language. Conditions can also be associated with specific instances of underlying management model types. Model type instances can represent objects being managed by a management application. Methods to obtain and set attributes on model type instances can be supported, as well as methods to navigate among model type instances.

The causal language model can support at least three operators that apply to conditions: causes; propagates; and triggers. The causes operator can relate conditions causally. The propagates operator can be used to propagate one or more conditions on a model type instance to another condition on a different model type instance. This can be useful, for example, for propagating status type conditions to container objects, based on the state of the contained objects. For example, for a server (a container object) containing a network card (a contained object), a failure of the card can cause an inactive status to propagate to the server. The triggers operator can be used to execute an operation on a model type instance based on the existence of a condition. This can be useful, for example, to direct select management processes to perform specified actions based on conditions received. In an exemplary implementation, a network application may poll an interface on a network device when a linkdown trap is detected on the interface, to determine the status of the interface.

Conditions

Conditions can be observable (concrete) or derived. In the context of a network management application, the observed conditions can represent changes in the states of managed entities. In an illustrative network management application, for example, the utilization of a managed interface exceeding a threshold may be an observable condition of interest.

In the illustrative causal language model, a condition can be uniquely defined by at least the following attributes: condition name; a managed entity type to which the condition applies; concrete versus derived; and severity. For example, in an illustrative causal language for use in modeling a networked computer system having a management application, an example of a concrete condition can be the ICMPNoResponse condition. Illustratively, ICMPNoResponse can be defined as follows in the causal language:

```
concrete condition ICMPNoResponse on AddressModelType state {
    ConditionGenerator == "com.hp.ov.nms.apa.cg.StateGenerator",
    Entity == "com.hp.ov.nms.model.layer3.Ipv4Address",
    Attribute == "iPAddressState",
    Value == "NOT_RESPONDING"};
```

In this example, ICMPNoResponse is the name of a concrete condition that can be used to describe the state of a system element having a managed IP address that has gone into a state of not responding to the ICMP ping protocol. Illustratively, ICMPNoResponse can apply to an object of type AddressModelType. In this example, the ConditionGenerator attribute can specify the Java class of the management application that is responsible for detecting and generating this condition. The Entity attribute can specify the Java class to which this condition applies. The Attribute and Value pair of attributes can define the state variable and value, respectively, for which this condition would apply on the Entity.

In this causal language example, an example of a derived condition can be the InterfaceDown condition. Illustratively, InterfaceDown can be defined as follows:

```
condition InterfaceDown on InterfaceModelType {
    severity == "critical",
    postincident == "true" };
```

Here, InterfaceDown is the name of a derived condition that can apply to an object of type InterfaceModelType. The severity of this condition is critical, and when this condition occurs, an incident reporting this problem is to be generated.

Model Types

In this causal language example, a model type can support a set of methods that can be used to qualify and relate conditions. Illustratively, model types can be defined in this example as follows:

```
modeltype AddressModelType {
    String belongsToNode( );
    boolean allAddressesDownInNode( );
    boolean oneOrMoreAddressesDownInNode( );
    boolean allAddressesUpInNode( );
```

```
    };
    modeltype InterfaceModelType {
        boolean allInterfacesUpInNode( );
        boolean isL2Connected( );
        boolean oneOrMoreInterfacesDownInNode( );
        String belongsToNode( );
        String neighborNode( );
        void poll( );
        void setNeedsAttentionOnNode( );
    };
```

In these illustrative model types, belongsToNode is a navigation method that, given an AddressModelType instance or InterfaceModelType instance, can provide an instance to the NodeModelType that contains the address or interface. The methods such as allInterfacesUpInNode can get attributes on instances of InterfaceModelType. The methods such as poll and setNeedsAttentionOnNode are examples of operations that can be associated to the trigger operator.

Variables

The examplary causal language can use variables to represent instances of model types. A condition can include both an instance of a model type, and an indication of some change on that instance. Illustratively, in the examplary language, a reference to a condition can be written as: <condition name> on <variable>

Illustratively, variables can be declared at the beginning of a causal declaration using a "with" clause. An example of such a variable declaration is: with InterfaceModelType::I, AddressModelType::A A causal declaration can also have one or more input conditions that can be derived from the condition usage in the declaration. Variable values can be bound to conditions as the conditions are input into the causal declarations.

In addition to condition references, variables can also be referenced in "where" clauses. Where clauses can be used to apply constraints on the conditions in the causal declarations.

Causal Declarations

Causal declarations can form a basic part of a language in accordance with the models presented herein. Illustratively, in this causal language example, InterfaceDown can be defined as a root cause problem. In a network having a management application, an interface can be regarded as down if its associated SNMP agent reports it as operationally down. Illustratively, additional symptoms of a down interface can include that an address contained in the interface does not respond to the ping protocol, and a link down trap may have been reported by the SNMP agent on a connected node.

Illustratively, these concepts can be represented in the examplary causal language as follows:

```
        with InterfaceModelType::I, Address::A
        condition { InterfaceDown on I }
        causes mandatory { IfOperStatusDown on I }
        causes optional { SNMPLinkDown on I}
        causes optional { ICMPNoResponse on A }
        where { I.containsAddress(A) };
```

As noted above, a necessary consequence of an interface being down is that its associated SNMP agent reports the interface is operationally down. This is illustratively represented by the IfOperStatusDown statement, indicating it is a mandatory result of the InterfaceDown condition. In addition, the InterfaceDown condition may optionally also present a symptom illustratively called SNMPLinkDown on the interface, and may optionally also present a symptom illustratively called ICMPNoResponse on a contained address.

Compiling Causal Declarations to Continuations

Continuations, and the continuation passing style (CPS) of programming, can be used in the examplary causal language. Instead of "returning" values as in the direct style of programming, an object written in CPS takes a continuation argument, which is meant to receive the result of the computation, and to invoke the continuation as the next operation. From the perspective of executing causal declarations, this process can be regarded as a sequence of receiving and consuming input conditions until all the declared criteria are met. If the criteria are never met, then the thread of execution can simply expire. However, if the criteria are met, then a specified acceptance action can be taken. Illustratively in the examplary language presented, in the case of "causes" and "propagates" statements, the action taken can be to assert the specified new condition. In the case of "triggers" statements, the action taken can be to invoke a further specified action.

To illustrate the compilation process, consider the above example of InterfaceDown. In an illustrative implementation, this causal rule can have three possible inputs (IfOperStatusDown, SNMPLinkDown, ICMPNoResponse), although other implementations are possible. Furthermore, in this illustrative implementation, these inputs can come in any order. In addition, two of the inputs are optional and the third is mandatory for the causal rule to be asserted. It is appreciated that in this exemplary implementation, because there are three possible inputs, three initial continuations are required to accept any of the three possible inputs. An initial continuation that accepts the mandatory input (i.e., IfOperStatusDown on I) will invoke the final continuation, which will be to assert the rule (i.e., assert InterfaceDown on I). The continuations that accept the optional inputs can invoke continuations that will want the mandatory input. For this illustrative implementation, a more formal description of the continuations follows, although other implementations are possible:

```
C1: { accept IfOperStatus; bind condition instance to variable I; invoke
   C5; }
   or { accept SNMPLinkDown; bind condition instance variable I; invoke
   C2; }
   or { accept ICMPNoResponse; bind condition instance variable A;
invoke C4; }
C2: { accept IfOperStatus; if (condition instance equals I) {invoke C5};
else {release
   IfOperStatus; invoke C2;} }
   or { accept ICMPNoResponse; bind condition instance variable A;
   if (I.containsAddress(A)) { invoke C3}; else { release
ICMPNoResponse; unbind A; invoke
   C2;} }
C3: { accept IfOperStatus; if (condition instance equals I) invoke C5;
else release IfOperStatus;
   invoke C3; }
C4: { accept IfOperStatus; bind condition instance variable I;
   if (I.containsAddress(A)) {invoke C5}; else {release IfOperStatus;
unbind I; invoke C4;}}
   or { accept SNMPLinkDown; bind condition instance variable I;
   if (I.containsAddress(A)) {invoke C3;} else {release SNMPLinkDown;
unbind I; invoke C4;}}
C5: { assert InterfaceDown on I; }
```

The compiled continuations comprise limited sets of actions that can be performed within the continuations. Illustratively, such actions can include one or more of accepting conditions, binding variables, releasing conditions, and executing where clause expressions. Illustratively, the execution of where clause expressions can be handled through Java reflection and invoking the underlying model types. The compilation of the causal declarations into continuations allows for a virtual machine, such as a Java virtual machine, to execute the continuations. The continuations can also be transformed into Java classes. Using Java classes, the causal declarations can be compiled directly to Java byte code or native code, for fast and efficient execution. Alternatively, a causal engine can use an interpreter for the underlying virtual machine.

An Engine for Performing Root Cause and Effect Analysis Using Received Conditions, Causal Declarations, and Continuations Described embodiments also include a root cause and effect analysis engine for use in analyzing a system comprising elements experiencing problematic symptoms. The engine can be extended to analyze a system of arbitrary complexity, and can be used to analyze a system in any modeled domain. Illustratively, a complex system comprising interrelated elements may be modeled by organizing the elements into planes, such as in accordance with characteristics the various elements have in common, for example, their function within the system. Using the analysis engine, root cause and effect analyses can be done over a plurality of planes in any modeled domain.

For example, in the domain of computer networking, an illustrative complex computer network system comprising many elements can be modeled as having three planes comprising the elements of the system. An application plane can comprise applications such as a web application, associated web server software, associated databases, and the like. A system plane can comprise devices within servers, servers, server clusters comprising servers, server farms comprising servers, and the like. A network plane can comprise elements such as routers, switches, communication links, interfaces, and the like. An example in a different domain may be a complex power distribution system comprising planes that exist at different system voltages. Many other examples of complex systems can be found in many different domains, such as biological systems, environmental systems, economic systems, etc.

What is common in analyzing such complex systems are the ways in which system elements are related, and the relationships between problematic symptoms of the elements. What is different is the underlying domain, which may include various planes of the domain model. The analysis engine can operate on abstractions of any type of system using appropriately defined conditions, causal rules, and continuations; and it can be used to analyze a system of arbitrary complexity because it can execute causal rules in a generic, extensible way. The engine can thus be adapted to different domains in a straightforward manner by providing the appropriate underlying domain model abstractions.

For instance, using the exemplary networked computer system having a management application presented above, root cause analysis can be accomplished even though the abstracted system elements can exist in various planes. FIG. 1 illustrates an example of such a system. In FIG. 1, an exemplary networked computer system is shown (100). The computer system can comprise a network plane (110), a system plane (120), and an application plane (130). The exemplary system is communicatively connected via a network cloud (140), such as the Internet, to user computers (150). Illustratively, the network plane can comprise elements such as Ethernet links (112), interfaces (113), routers (114), switches (115), and the like. The system plane can comprise elements such as servers (122), server clusters (124) comprising servers, and server farms (126) comprising servers. The application plane can comprise elements such as hosted web applications (132), and associated web server applications (134) and databases (136). Problems experienced on one plane can cause problematic symptoms on elements of another plane. For example, if two Ethernet links fail (118), that failure can render two servers of a server farm inaccessible (128) by disconnecting them from the rest of the system. The result may be slowness in the performance of a database, depended on by an application server serving a web application displayed on user computers (150), causing the user to experience a slow response in the web application. A possible effect may be that the server farm can be put at risk of failure.

In an illustrative embodiment, where system elements and events on the system elements are causally related and modeled, an analysis engine can perform root cause determination of one or more symptoms indicative of a problem on the system. In addition, the analysis engine can analyze the effects of the determined root cause on the system. As described above, an exemplary computer programming language adapted to the continuation passing style (CPS) of programming can be used to develop such a troubleshooting and analysis system, which can be used in conjunction with a management application for managing the system. The computer language can be used to:

1. Define the "inputs" and "outputs" of conditions used by the engine;
2. Define the causal relationships of the conditions; and
3. Define the underlying model.

In particular, for example, with regard to an exemplary complex computer system having a management application as described above, an illustrative system element may be defined as follows:

```
with InterfaceModelType::I, AddressModelType::A
    condition { InterfaceDown on I }
    causes mandatory { IfOperStatusDown on I }
    causes optional { AddressDown on A}
    where { I.contains(A) };
```

This definition states that, with regard to the modeled element, the condition InterfaceDown, which represents its operational status being down, mandatorily causes IfOperStatusDown, and optionally can cause a contained network address to also be down. In this example InterfaceDown can represent a root cause condition (also called a "conclusion") and IfOperStatusDown and AddressDown can be concrete (observable) conditions.

Conditions, representing problematic symptoms of system elements, can be defined as follows:

```
concrete condition IfOperStatusDown on InterfaceModelType state {
    ConditionGenerator == "com.hp.ov.nms.apa.cg.StateGenerator",
    Entity == "com.hp.ov.nms.model.core.Interface",
    Attribute == "operationalStatus",
    Value == "DOWN" };
concrete condition ICMPNoResponse on AddressModelType state {
    ConditionGenerator == "com.hp.ov.nms.apa.cg.StateGenerator",
    Entity == "com.hp.ov.nms.model.layer3.IPv4Address",
    Attribute == "ipAddressState",
    Value == "NOT_RESPONDING"};
condition InterfaceDown on InterfaceModelType {
    postIncident == "true",
    severity == "critical"};
```

A Java class can be specified in the condition definition, which can be used to deliver the condition to the analysis engine. The ConditionGenerator statement in the above example specifies such a Java class. A Java class can also be specified in the condition definition to specify the domain type to which the condition applies. The Entity statement specifies such a Java class. The specific Attribute name and Value are also specified in the condition definition that can cause the condition to be generated.

The root cause condition specifies a severity and a postIncident flag that determines whether an incident should be generated for this problem.

The domain model types themselves can also be defined as Java classes. For instance, the following definitions can be used in the examplary system:

```
modeltype AddressModelType {
    String belongsToInterface( );
};
modeltype InterfaceModelType {
    boolean contains(AddressModelType);
};
```

A set of related modeltypes, conditions and causal declarations can be combined together into a module or set of modules. The modules can be imported into the analysis engine to provide analysis content. For example, in the context of the examplary computer system with management application presented above, IP network analysis content can be provided using the following modules:
1. IP Address
2. SNMP Agent
3. Interface
4. Node
5. Connection
6. Port
7. Aggregate
   Execution Model Management applications typically comprise monitoring functionality, for monitoring or determining the status of elements on the monitored system. The monitoring function of a management application can also typically detect relevant state changes on elements, which can be represented by concrete conditions of the examplary system models presented herein. A Java class can be implemented to pass these concrete conditions to a causal analysis engine.

The analysis engine can receive as inputs the concrete conditions generated using, for example, information provided by the management system, and can determine which of the defined causal rules to apply to the received conditions. For each candidate rule a "hypothesis" regarding the root cause of the received condition can be created. If all the conditions of the hypothesis are met, then the hypothesized root cause can be asserted as a conclusion. The conclusion can then be asserted as a new condition, and the engine can then determine which of the causal rules to apply to the new condition. Advantageously, each condition can be bound to an instance of a modeled element in the underlying domain model. This process can be repeated until all conditions are satisfied, and a final root cause is determined.

Proactive Analysis

In many root cause analysis situations, it may be helpful to solicit additional symptoms in order to progress in the analysis or to disambiguate a plurality of possible root causes. To facilitate this, the causal language supports triggering an action for the purpose of generating additional information, such as to reveal additional symptoms. In an examplary implementation, if a node is down, the only symptom that may be initially reported is that the node is not responding to SNMP. Because this symptom can arise due to more than one root cause, it is helpful to trigger one or more additional actions to generate additional information to discover additional symptoms. For example, triggers can be generated to poll the node's neighbors, in order to determine how the neighbors respond, and to disambiguate whether the node is down, or whether only the agent process down. For example:

```
with Node::N
    condition NoSNMPResponse on N
    triggers { N.pollConnectedInterfaces( ) };
```

In this examplary implementation, this can be read as "invoke the polling method for all interfaces that are directly connected to the node N."

As illustrated in examples presented above, a causal rule definition may be constrained by a where clause (e.g., where {I.contains(A)}). In an examplary implementation, the engine can invoke the underlying domain methods through Java reflection, and can capture the results to guide the execution of the hypothesis. When a conclusion is asserted, it can be posted to a blackboard. The blackboard can comprise a shared repository of partial solutions managed by the engine, the engine controlling the flow of problem-solving activity. The blackboard can also create the functional artifacts necessary for determining the final root cause. This may include generating incidents such as triggering polling events, or setting state attributes on underlying domain instances.

In an examplary implementation, a parser for parsing program statements, and a module loader for loading program modules as defined above, provide the function of configuring the engine rules. The causal rules, model types, conditions, and continuations can be provided in a text file. The process of loading the file can accomplish configuring the rules and establishing linkages to the underlying condition generators and model types. Blackboard functions such as incident posting and setting of statuses, can also be regarded as part of the model type signature.

The engine can be used and reused in different management domains, by adapting the underlying domain model, system element definitions, conditions, causal rules, continuations, blackboard, and domain model types to a new underlying management system in a new domain. Illustratively, once adapted to a particular domain model, causal rules and rule sets can be added, deleted, and modified as needed for customization in a particular implementation.

Figure 2:
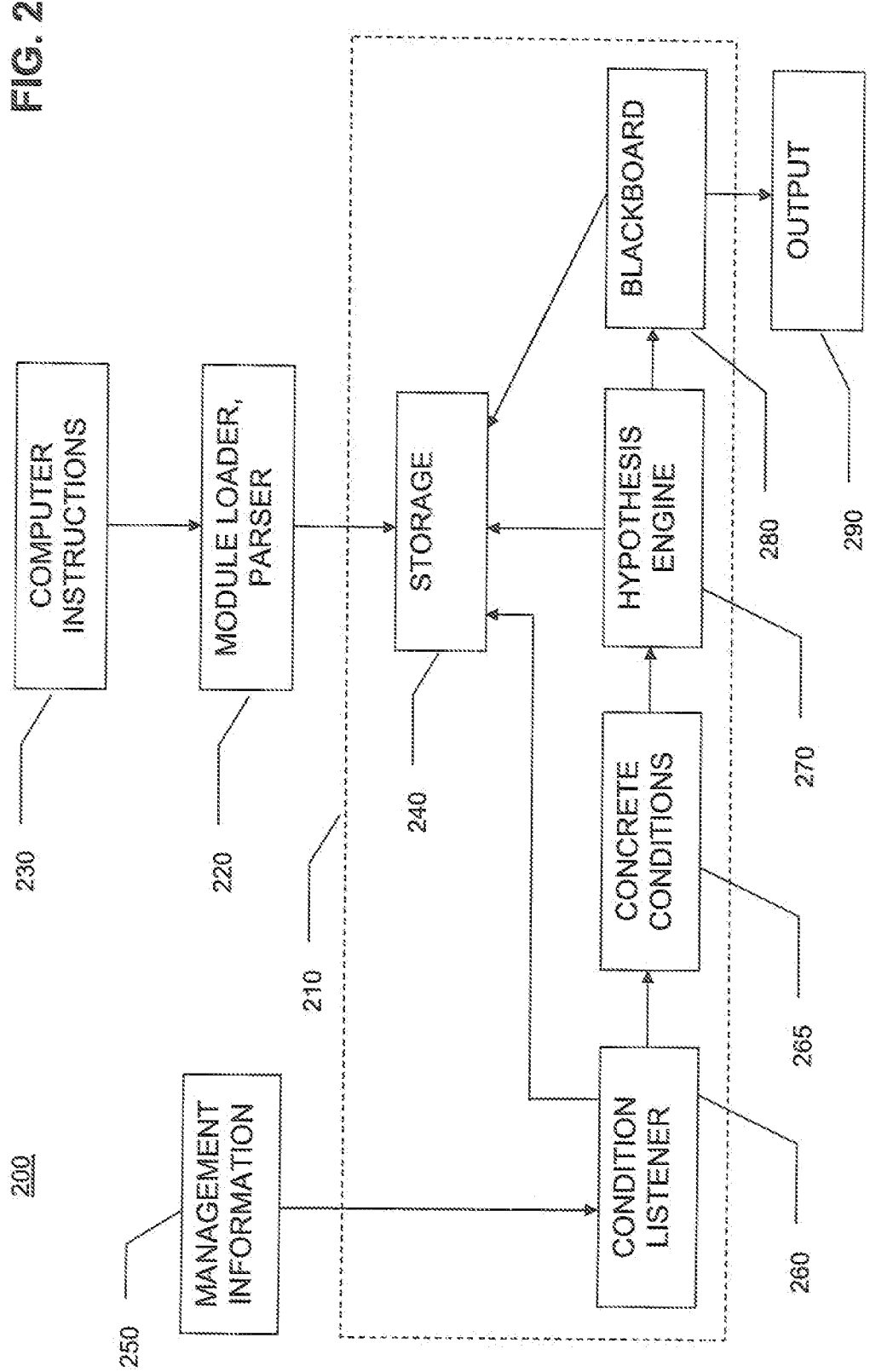
FIG. 2 is a block diagram of an exemplary causal engine architecture.

Referring now to FIG. 2, an exemplary causal engine architecture (200) is shown, comprising causal engine (210). The causal engine can be set up by parser and module loader (220), which parses and loads modules containing computer statements (230) into module storage (240). The statements can include model type definitions, declarations of conditions, causal rules, and continuations. In operation, the causal engine (210) receives a stream of information from a system management application (250). The conditions are received at a condition listener (260). The condition listener consults the loaded modules to determine if the system is configured to process such conditions. The main function of the condition listener is to normalize the received management information into concrete conditions (265).

The concrete conditions are provided to hypothesis engine (270). Hypothesis engine (270) can consult module storage (240) and can create one or more hypotheses representing possible root causes of the received conditions, and can provide them to the blackboard (280).

Concrete conditions can be matched to the rules that take such conditions as input. To do so, the existing hypotheses are examined to see if they can consume the conditions. If no existing hypothesis can consume a condition, then one or more new hypotheses can be generated that can consume the condition.

A hypothesis that is asserted becomes a root cause conclusion. In addition, a conclusion can be retained by the blackboard (280) which can manage the artifacts of the root cause. Illustratively, artifacts of a root cause may be to post an incident, to set the status of some managed entity, etc. The blackboard can also manage the lifecycle of a conclusion. For example, it may hold a conclusion for possible suppression. The blackboard can also perform cancellation of conclusions. A root conclusion that satisfies all received conditions can be provided at output (290).

Using Causality as a Model-Based Approach to Do Root Cause and Impact Analysis

In an embodiment, analysis of the effect of an asserted root cause that combines causal rules with a model-based logic is also provided. For example, causal engine (210) can be used to determine the effect of the determined root cause on the modeled system, using the loaded model type definitions and continuations. In an exemplary implementation, a layered protocol such as Multiprotocol Label Switching (MPLS) can be used to provide services such as virtual private networking (VPN). In such a system, a failed interface may result in the MPLS VPN also failing. To facilitate analysis of the effect of a failing MPLS VPN, the causal language can support a "propagate" clause, whereby a condition can be propagated, such as to another object. In this exemplary implementation, the following condition definition can be used to define this type of causal relationship:

---
condition InterfaceDown on Interface::I with VPN::V
propagates VPNImpaired On V
where { V.layeredOn(I) }
---

Multiple Plane Analysis

An advantage to using causal analysis is that relationships between entities that exist in different planes of a system can be represented, and the relationships can be used to determine a root cause even far removed from the symptoms reported by a management application. For example, as described, a managed network application can include one or more network planes, systems planes, and applications planes, each plane comprising many elements which can themselves be inter-related. It may be observed from web clients on user computers that a web-based system is experiencing slow performance. Symptoms can be collected at the managed planes, such as performance alarms, cluster status, and various other information. The determined root cause of such a situation may be that a connection has failed between servers in a database cluster, leaving only one server running in the cluster.

An analyst, such as a network administrator, would want to discover as quickly as possible the real problem, so that appropriate corrective action can be taken without undue delay, and effects on users minimized. If a connection is actually down, the administrator will want to determine that as quickly as possible, and preferably without having to organize and triage all of the symptoms being reported by the managed environment.

Figure 3:
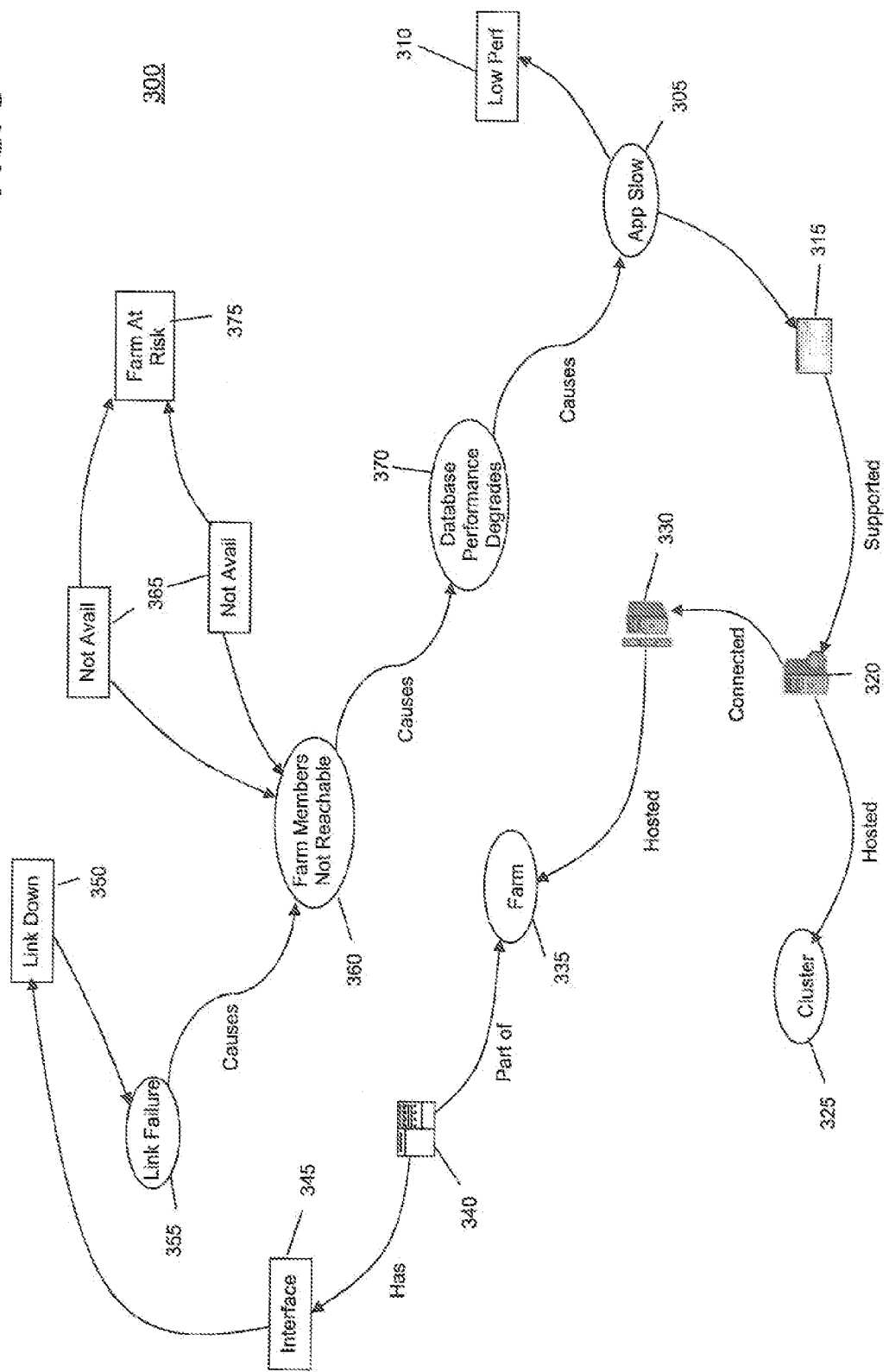
FIG. 3 shows a causal graph indicating relationships between various system elements of the system of FIG. 1, experiencing symptoms indicative of a problem on the system.

FIG. 3 shows an exemplary causal graph (300) indicating relationships between various system elements experiencing symptoms indicative of a problem on such an exemplary modeled system, for example, the system of FIG. 1.

Illustratively, an analysis engine can receive management information from one or more management applications that monitor the three planes of the exemplary computer network, and normalizes the data into a stream of conditions. A first symptom of a problem may be that a web application has slowed down (305). A user of the application may complain to a technician that the application has slowed, and the technician may provide information of the slowdown to the analysis engine. The engine may trigger a management application to confirm the low performance (310). The web application (315, 132) is supported by an application service, such as a web application server (320, 134), that is hosted on a server cluster comprising several servers (325, 124). The web application server is connected to and depends on one or more instances of a database (330, 136) hosted on a server farm (335, 126). The database is distributed over several servers (340) that are interconnected via a network switch (115) through network interfaces (345, 119). The analysis engine can hypothesize that the slowness is caused by one or more servers of the server farm being inaccessible, and can trigger the management application to ping the switch (350). The root cause of the problem is identified as a link failure (355, 118) between the switch and some of the servers. This has resulted in two of the managed servers in the database farm becoming unreachable (360, 128).

In addition, the management system of the database servers may detect that two of the managed servers are unavailable (128) and send symptoms (365) that indicate the database farm is not fully operational. Furthermore, the performance of the database instance that supports the web application may degrade (370), and the database monitoring application may detect this and send additional performance symptoms (not shown). Finally, the management of the web application (315, 132) may detect performance problems in the application and emit symptoms regarding the application performance (310). These symptoms are consistent with the determined root cause.

The analysis engine can also determine the effect of the root cause on the complex computer system by deducing that the server farm may be at risk (375).

The provided causal analysis engine can thus be used in an analysis system to provide to the analyst the capability to quickly determine the root cause of observed problematic symptoms, and analyze the effect of the determined root cause on the system. This approach to root cause and effect analysis combines condition information and model-based logic to provide a fast and effective mechanism for doing such analyses. A simple declarative language is provided that recognizes both root causes and condition information. The complexities of the underlying relationships are represented and accounted for automatically, and can therefore be removed from the process of determining the root cause of the observed symptoms. Furthermore, conditions can come from any source in the managed environment, enabling cross domain analysis.

Various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of compiling causal rules into continuations for use in root cause analysis of a system comprising a plurality of inter-related elements, the method comprising:

defining observable events occurring on system elements;
defining at least one of a cause and a result of each of the events;
defining causal rules, each rule describing a causal relationship between an event and its cause or its result; and
compiling the causal relationships as continuations in a continuation passing style (CPS) for use in analyzing the root cause of at least one observed event symptomatic of at least one problem on the system.

2. The method of claim 1, wherein each causal relationship is one of a mandatory relationship such that the presence of the event requires the related cause or result, and an optional relationship such that the presence of the event does not require the related cause or result.

3. The method of claim 1, wherein the defining of observable events on system elements comprises defining specific states of element properties having more than one state, at least one state symptomatic of an element problem.

4. A method of managing a system comprising a plurality of inter-related elements, comprising:
defining conditions on system elements indicative of problems of the elements;
defining causal rules, each rule describing a causal relationship between a condition and its cause or result;
compiling the causal relationships as continuations in a continuation passing style (CPS); and
using the conditions, causal rules, and continuations to determine the root cause of observed events symptomatic of at least one problem on the system.

5. The method of claim 4, further comprising:
using the conditions, causal rules, continuations, and the determined root cause to determine an the impact of the root cause on the system.

6. A non-transitory computer readable medium for use in performing root cause analysis in a system comprising a plurality of inter-related elements, the computer readable medium comprising computer-readable instructions to cause a processor to:
define observable events occurring on system elements;
define at least one of a cause and a result of each of the events;
define causal rules, each rule describing a causal relationship between an event and its cause or its result; and
compile the causal relationships as continuations in a continuation passing style (CPS) for use in analyzing the root cause of at least one observed event symptomatic of at least one problem on the system.

7. The medium of claim 6 further comprising computer-readable instructions to cause the processor to:
define conditions on the system elements indicative of that at least one problem of the elements; and
use the conditions, causal rules, and continuations to determine the root cause of the observed events symptomatic of at least one problem on the system.

8. The medium of claim 7, further comprising computer-readable instructions to cause the processor to:
use the conditions, causal rules, continuations, and the determined root cause to determine an impact of the root cause on the system.

* * * * *

UNITED STATES PATENT AND TRADEMARK OFFICE
CERTIFICATE OF CORRECTION

PATENT NO. : 8,447,719 B2
APPLICATION NO. : 12/239755
DATED : May 21, 2013
INVENTOR(S) : Bob Bethke et al.

It is certified that error appears in the above-identified patent and that said Letters Patent is hereby corrected as shown below:

In the Specification

In column 1, line 15, before "entitled" delete "200701781-1/411478)".

In the Claims

In column 14, line 3, in Claim 5, after "an" delete "the".

Signed and Sealed this
Fifth Day of November, 2013

Teresa Stanek Rea
*Deputy Director of the United States Patent and Trademark Office*